Oct. 8, 1929.   C. W. BURROWS   1,730,966
METHOD OF AND APPARATUS FOR TESTING MAGNETIZABLE OBJECTS
Original Filed Oct. 3, 1923   4 Sheets-Sheet 1

INVENTOR
Charles W. Burrows
BY
ATTORNEY

Oct. 8, 1929.                    C. W. BURROWS                    1,730,966
          METHOD OF AND APPARATUS FOR TESTING MAGNETIZABLE OBJECTS
                Original Filed Oct. 3, 1923      4 Sheets-Sheet 2
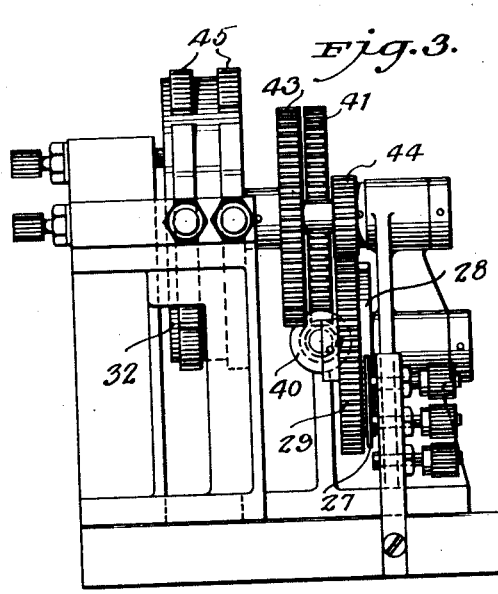
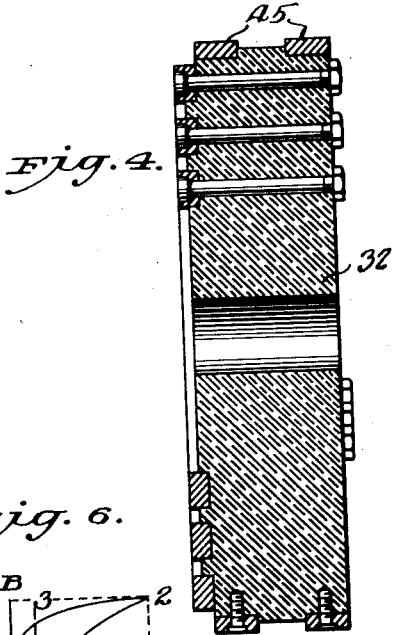
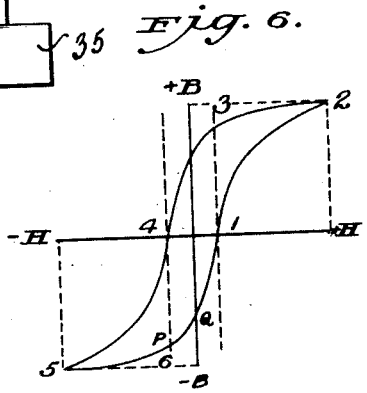
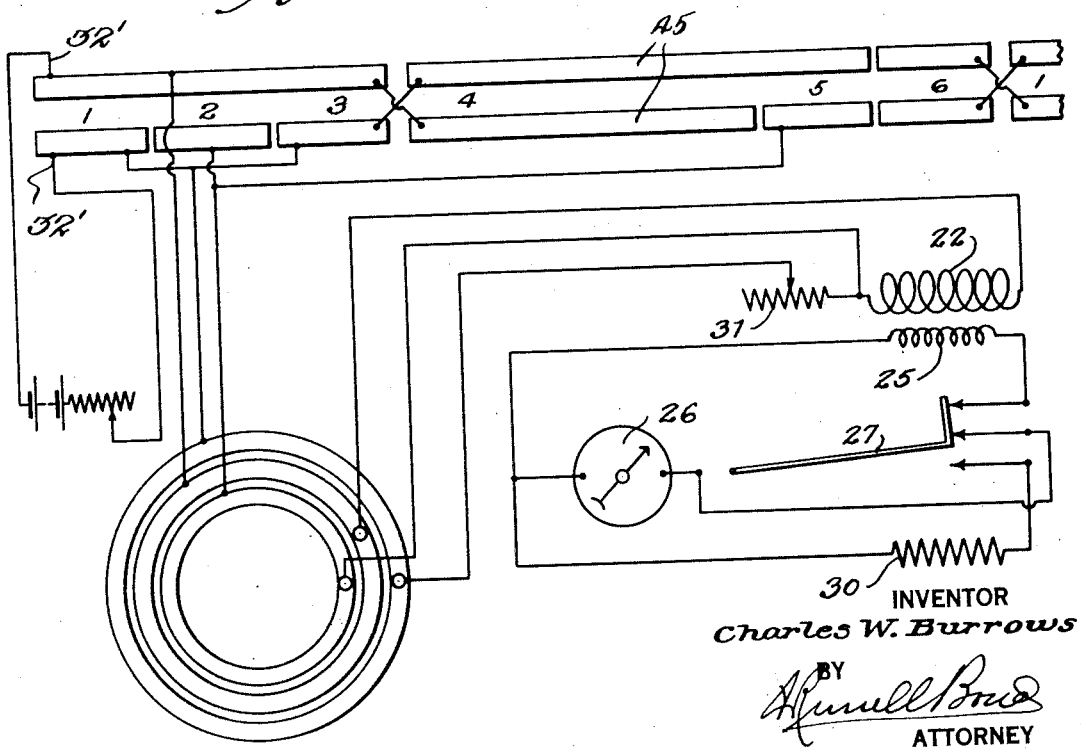
INVENTOR
Charles W. Burrows
BY
ATTORNEY Oct. 8, 1929.   C. W. BURROWS   1,730,966
METHOD OF AND APPARATUS FOR TESTING MAGNETIZABLE OBJECTS
Original Filed Oct. 3, 1923   4 Sheets-Sheet 4
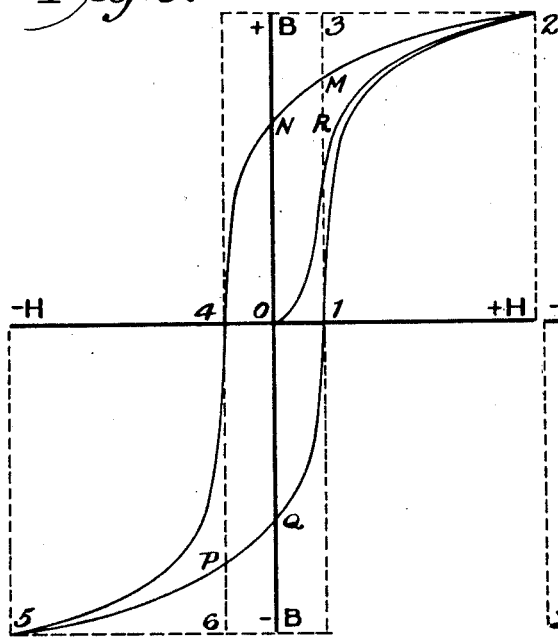
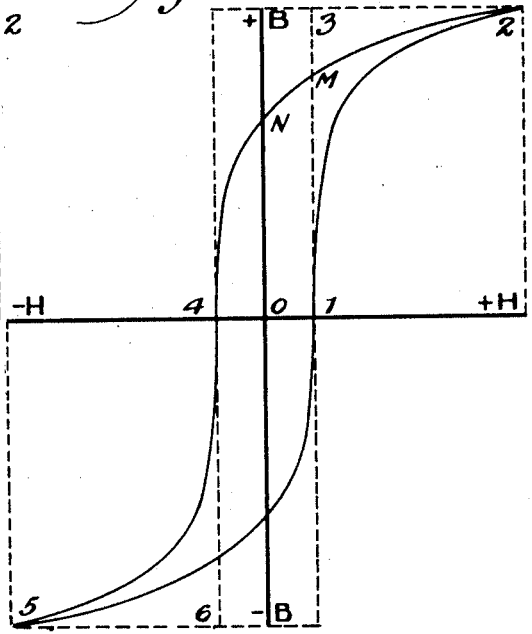
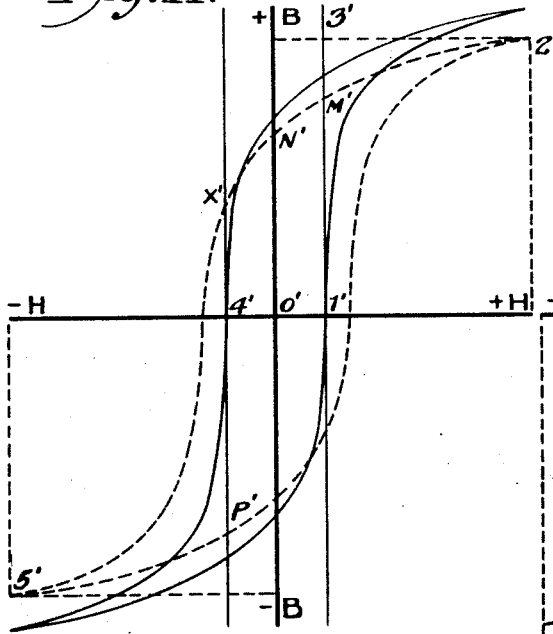
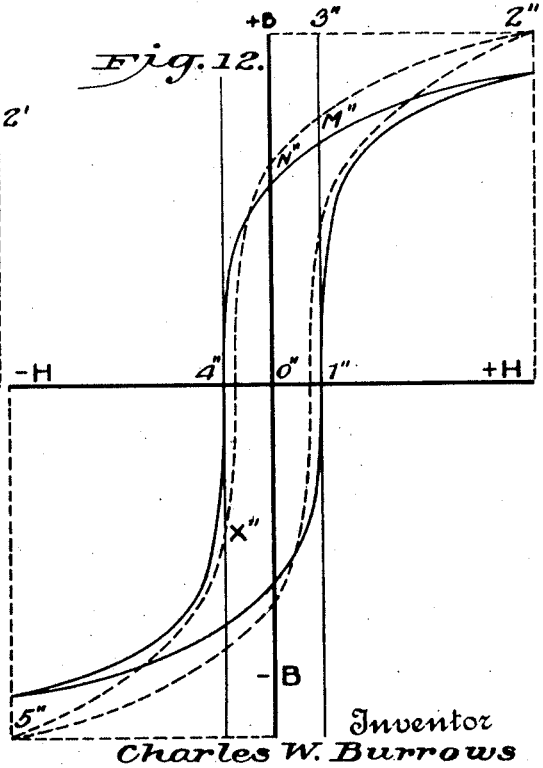
Inventor
Charles W. Burrows
By his Attorney Patented Oct. 8, 1929

1,730,966

UNITED STATES PATENT OFFICE

CHARLES W. BURROWS, OF NEW YORK, N. Y., ASSIGNOR, BY MESNE ASSIGNMENTS, TO MAGNETIC ANALYSIS CORPORATION, OF LONG ISLAND CITY, NEW YORK, A CORPORATION OF NEW YORK

METHOD OF AND APPARATUS FOR TESTING MAGNETIZABLE OBJECTS

Application filed October 3, 1923, Serial No. 666,361. Renewed February 18, 1929.

This invention relates to improvements in a method of and apparatus for testing the physical properties of magnetizable objects, particularly to an apparatus for testing comparatively small articles such as drills, lathe tools, hack saws and other articles of the same general nature which may be handled with facility.

An object of the present invention is to provide an automatic apparatus to utilize a more efficient method and to simplify and expedite the testing operation.

With these and other objects in view, the invention consists in certain novel features of construction and combinations and arrangements of parts as will be more fully hereinafter described and pointed out in the claims.

The accompanying drawings are illustrative of one way in which the invention may be carried out. In these drawings:

Fig. 3 is a view in end elevation thereof,

Fig. 4 is an enlarged vertical sectional view through the rotary contact wheel,

Figure 1:
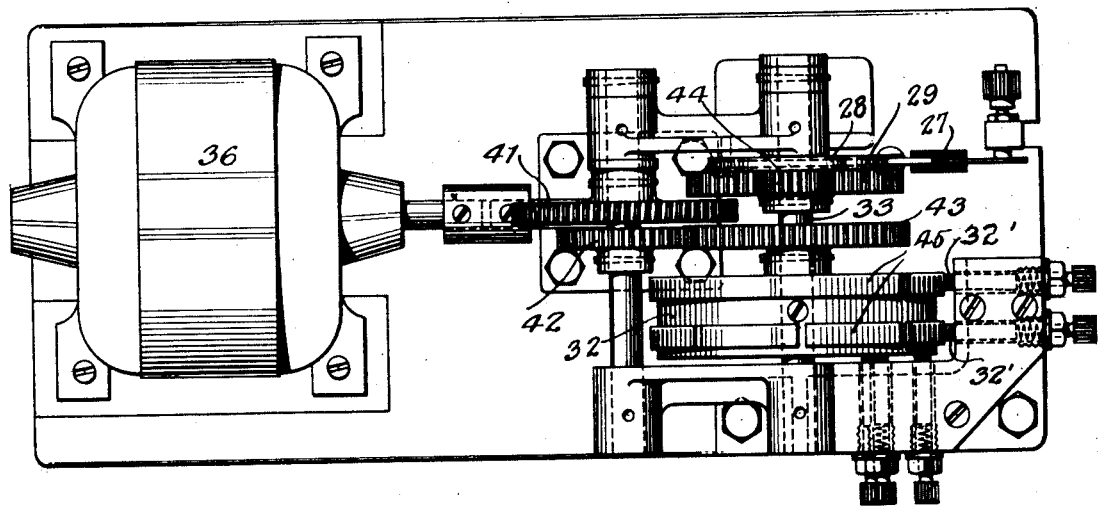
Fig. 1 is a plan view of the rotary switch mechanism.
Figure 2:
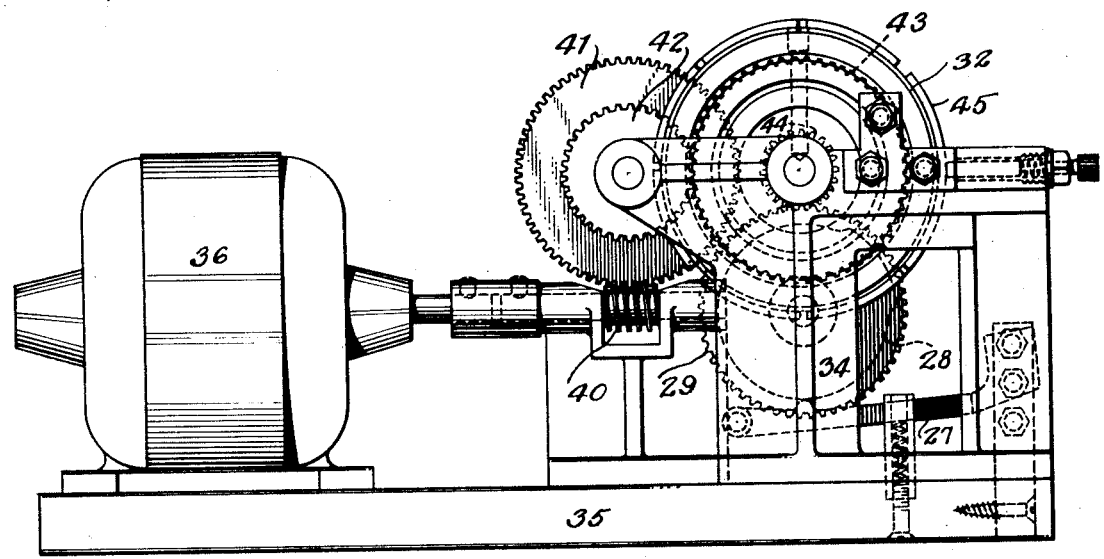
Fig. 2 is a view in side elevation thereof.
Figure 7:
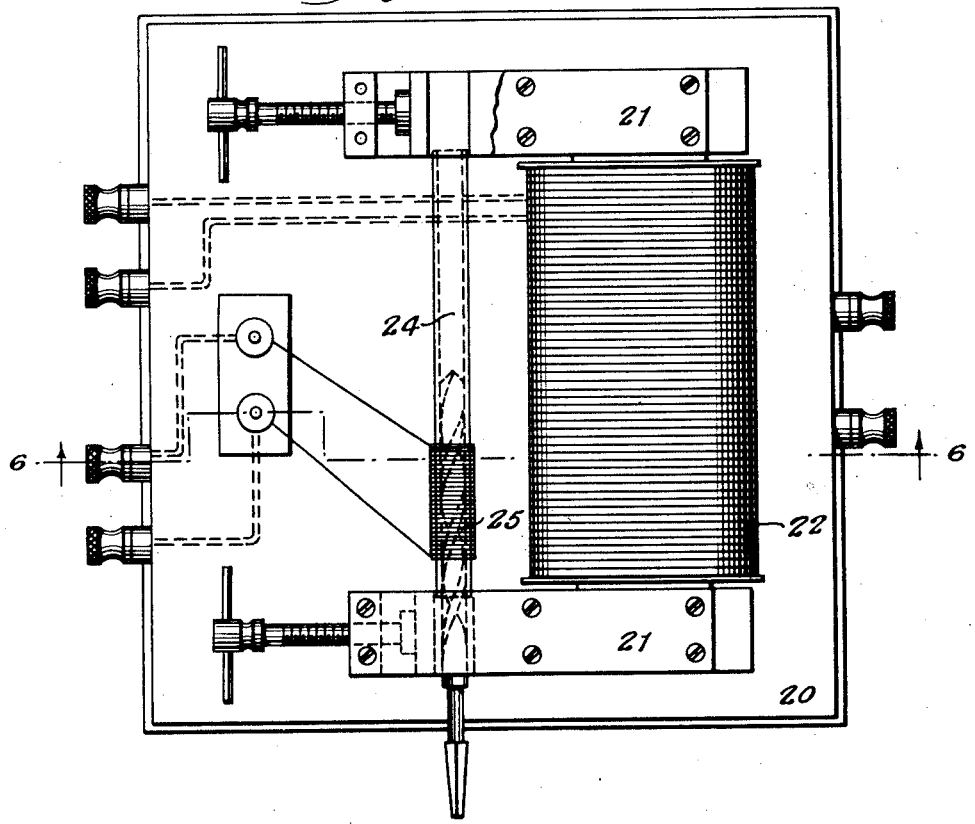
Figure 8:
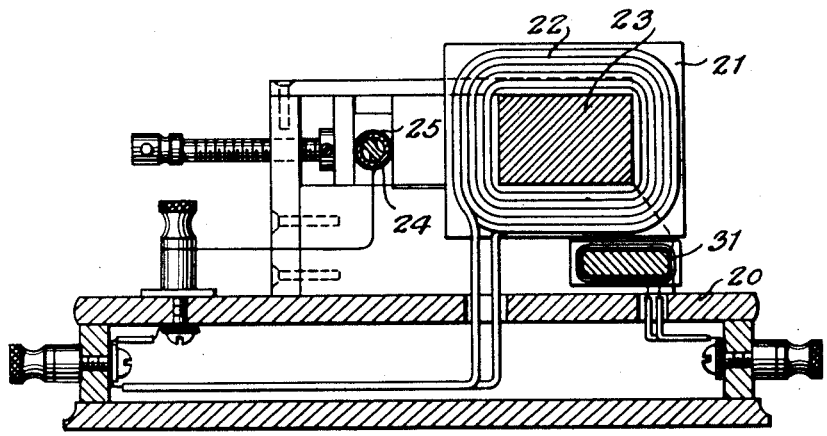

Fig. 5 is a wiring diagram showing the electrical circuits used and illustrating diagrammatically the successive steps used in carrying out my method, Fig. 6 is a graph of a hysteresis loop showing the magnetic effect of the successive steps upon a standard specimen, Fig. 7 is a plan view of the specimen receiving device, Fig. 8 is a view in transverse section on the line 8—8 of Fig. 7, Figs. 9, 10, 11 and 12 are graphs of hysteresis loops indicating the magnetic effect of my process upon standard specimens and upon specimens relatively harder or softer than standard.

In order that the invention be clearly understood, I shall first explain generally the method used, further graphically explain the same with the aid of the diagrammatic illustrations of Figures 9 to 12 inclusive, and finally, explain the structural details and operation of the apparatus for mechanically and automatically performing the method.

The method, generally speaking, consists in the determination of the variation in one or more of the magnetic properties of a body of magnetizable material when the test object is submitted to a magnetic field which varies from an initial value to a final value through a prescribed course. The apparatus involves a means for producing a magnetic field, a means for causing this magnetic field to vary in a predetermined manner, and a means for indicating the variations of one or more of the magnetic characteristics of the material under test.

The essential features of the method consist in causing the magnetic condition of the test object to pass from one point to another of the hysteresis loop and observing the change in magnetic induction or some effect of the change in magnetic induction due to this complicated process.

By referring to the graphs of Figures 9 to 12, the method will be made more apparent. In all of these graphs, the line H— H+ represents the nature and the amount of a magnetizing force. The line B— B+ represents the nature and amount of magnetization or flux in a specimen undergoing test. In Figure 9, we may assume that the specimen under consideration is one which has never before been subjected to the action of a magnetic field and its magnetization is therefore zero. Assume that a magnetizing force 1 is applied. The magnetization of the iron is then indicated by the line $R^1$, the increase of magnetization or the action of the magnetic flux following the line OR. If the magnetizing force be increased to +H, the magnetization will reach saturation or +B and the peak of the hysteresis loop will be reached at 2. Assume now that the current or magnetizing force is reduced again to 1. The magnetization will drop to M, and if the force be reduced to zero, the residual magnetism in the specimen is indicated at N. A magnetizing force of 4 in the opposite direction reduces the magnetization to zero. By following the diagram of Figure 9 through, it will be seen that greater magnetizing force raises the negative magnetization of the specimen to the negative peak 5 and that a complete reversal of the force returns the magnetization to the positive peak 2 of the hysteresis loop.

The hysteresis loops of Figures 9 and 10 and the full line loops of Figures 11 and 12 represent the effect of the process just described upon a standard specimen. By a standard specimen, I mean a specimen which may be selected as standard, not one which conforms to any particular standard of hardness or grain structure. The dotted line loop of Figure 11 represents the magnetic effect of a similar process on a specimen which is softer and coarser grained than the standard, while the results of the process on a harder, finer grained specimen are indicated by the hysteresis loop shown in dotted lines in Figure 12.

A change in the intensity or direction of the magnetic flux will generate in a coil introduced in the flux a certain E. M. F. Thus E. M. F.$= N\emptyset$ in which N represents the number of turns in the coil and $\emptyset$ the flux or the magnetic lines of force. The N factor of this equation is constant in using my method. The $\emptyset$ factor varies with the physical properties of different specimens since the magnetizing forces used in each instance are the same. If, therefore, I use a galvanometer 26 (Fig. 5) in circuit with a testing coil 25 through which the magnetizing force flows, it will be possible for me to measure the E. M. F. generated by any predetermined change in magnetic induction. This change may involve merely the increase of magnetizing current from one value to another, the decrease from one value to another, the continuous or intermittent change from one value to another of the same or opposite sign, or the change from one value to the following maximum and the subsequent reduction and possible reversal and increase in the opposite direction. This complicated change in magnetizing force coupled with the single determination of the effect is quite novel.

Assume, for instance, that with a standard specimen, the magnetizing force is reduced from H+ to 1 (Fig. 9). The E. M. F. generated and registered by the galvanometer will be proportional to the change in induction indicated by the line 3M. With the softer specimen in place, the E. M. F. generated by a similar change would be considerably less, as indicated by the line 3'M' of Figure 11. A harder specimen would result in the generation of considerably more E. M. F. graphically shown by the line 3"M" in Figure 12. By thus noting the difference in E. M. F. generated by similar changes in magnetizing force when different specimens are tested, I can readily detect any variation from standard in the specimens. I can also determine whether the specimen is above or below standard hardness and grain size.

In carrying out the process, I can of course measure the E. M. F. generated by any change in the intensity or direction of the magnetizing forces. For purposes of illustration, I show an apparatus adapted to measure the E. M. F. generated by increasing the force from 1 to H+ and reversing the force to 4. The resultant E. M. F. with the standard specimen is zero as seen in Fig. 10. In Figs. 11 and 12, the resultant E. M. F. is indicated upon the lines 4'X' 4"X" respectively and of course varies in each instance with the physical properties of the material under test.

For a complete understanding of the apparatus, reference may be had to Figures 1 to 5 inclusive and Figure 7 of the drawings, wherein the numeral 20 represents a base plate from which rise brackets or standards 21 between which there is supported an inducing or primary coil 22 of insulated wire wound upon a core 23 of magnetic material. This coil receives direct current from any convenient source of electrical energy (not shown). Upon a tubular specimen holder 24 extending between the brackets 21, there is wound the secondary or testing coil 25 previously referred to, adapted to be placed in circuit with the galvanometer 26 above mentioned by a switch 27. Movement of the switch is controlled by a cam 28 on a gear 29 driven in a manner to be more fully hereinafter described. When the switch is not in position to close the galvanometer circuit through its coil 25, it is in position to close it through the resistance 30 so that the galvanometer is controlled through this resistance.

A resistance 31 thrown into or out of the primary or inducing circuit by the operation of a rotary contact wheel 32 serves as a convenient means for controlling the strength of the current in the primary circuit, or in other words, the magnetizing force. The resistance is adjustable, as indicated in Fig. 5. For convenience of assemblage, this resistance may be in the form of a coil supported upon the base 20 below the coil 22.

Referring to Figure 6 of the drawings, it will be seen that a process magnetically affecting the specimen as indicated by the hysteresis loop may be carried out by successively throwing on the current, with the resistance in throwing out the resistance 31, throwing in the resistance, reversing the current, again throwing out the resistance, throwing in the resistance and again reversing the current with the resistance in. In Figure 6, we may assume the normal current to be on at 1, resistance out at 2, resistance in at 3, current reversed at 4, resistance out at 5, resistance in at 6 and current again reversed and normal at 1. This apparatus is designed to measure the E. M. F. generated by passing from 1 to 4 on the loop of Fig. 6. Consequently, the galvanometer is thrown in circuit with the coil 25 from 1 to 4 or from just before the resistance 31 is thrown out until it is again inserted in the circuit and current reversed.

The means by which this rather complicated process is carried out is indicated diagrammatically in Figure 5. Figures 1, 2, 3, and 4 illustrate the mechanical details of the switching mechanism for carrying through the process. The contact wheel 32 previously referred to is journalled on a shaft 33 borne in a suitable frame 34 mounted upon a base 35. The base 35 also serves to support a motor 36 which drives the contact wheel 32 at a constant speed through a train of speed reducing gears 40, 41, 42, 43. The gear 29 carrying the cam 28 is driven from the wheel shaft 33 by a pinion 44, the ratio of speed between the contact wheel and the gear 29 being approximately 3 to 1, so that the galvanometer is thrown in every third revolution of the contact wheel. In other words, the specimen is run through the hysteresis loop several times before it is actually tested. This is done in order that the specimen may be placed in a cyclic state or in order to reach a true hysteresis loop. Since some of the specimens may be of virgin stock while others may contain considerable residual magnetism, I have found that this procedure is advisable, in order to secure the most accurate measurements with the galvanometer.

Two series of contact members 45 are arranged on the periphery of the wheel 32 and co-operate with suitably arranged brushes 32', 32'. The electrical connections between such contact members and the various other parts of the apparatus have been shown only diagrammatically. Any skilled electrician could make the necessary connections. The description thus far has made it evident that the production of the cyclic state of the specimen, the variation of the magnetic field, and the insertion of the galvanometer in the circuit at the proper time are all carried out automatically, so that the only operations left to an attendant are the insertion of the specimen in the holder 25 and the observation of the galvanometer.

The successive steps in the process may be followed out in the wiring diagram of Figure 5. At 1, the current is on and the resistance 31 is in; at 2, the resistance 31 is thrown out; at 3, the resistance is re-inserted; at 4, the current is reversed; at 5, the resistance is again thrown out, and at 6 again re-inserted, and at 1, the current is reversed. The cam 28 operates the switch 27 to throw the galvanometer in from 1 to 4 on the third revolution of the contact wheel to measure the E. M. F. designated by the lines X'4', 4"X" of Figs. 11 and 12, and which is zero with the standard specimen as seen in Fig. 10.

I am of course aware of the fact that it has long been known that the state of magnetization under a given magnetizing force or after a sequence of magnetizing forces may be used as an indication of the physical properties of a specimen of steel. Efforts to make use of this fact, however, have been made with but indifferent success, partly, because proper magnetic quantities were not taken as criteria, partly because the quantities considered desirable could not be determined by a single operation or in a sufficiently simple manner to be economically useful.

The essence of my invention consists in the determination of the proper magnetic characteristics to be determined and in the provision of suitable apparatus for the efficient determination of such quantities. Various slight changes and alterations might be made in the general form and arrangement of the parts described without departing from the invention, and hence I do not wish to limit myself to the precise details set forth, but shall consider myself at liberty to make such changes and alterations as fairly fall within the spirit and scope of the appended claims.

I have shown an indicating instrument in the form of a galvanometer. It is to be understood, however, that the word indicating as used in the appended claims is to be construed in its broadest sense as covering any means of visibly or audibly indicating to an operative or any means of recording upon a permanent record or marking upon the object itself.

I claim:

1. A method of testing magnetizable objects which consists in subjecting them to a magnetic field of varying intensities, and indicating a magnetic effect resulting from such variation between two intensities, neither of which is the maximum of said first named intensities.

2. A method of testing magnetizable objects which consists in subjecting them to a magnetic field varying between certain positive and negative maxima, and indicating a magnetic effect resulting from such variation between values other than said maxima.

3. A method of testing magnetizable objects which consists in subjecting them to a magnetic field varying in value between certain positive and negative maxima, and indicating a magnetic effect resulting from such variation between values intermediate said maxima.

4. A method of testing a magnetizable object which consists in subjecting the object to a magnetic field repeatedly varying between certain maxima of opposite polarity through certain pre-determined intermediate values and indicating a magnetic effect resulting from such variation between one intermediate value through one of said maxima to another intermediate value.

5. A method of testing a magnetizable object which consists in subjecting the object to a magnetic field repeatedly varying between certain maxima of opposite polarity until said object is in a cyclic condition, and then indicating an effect produced by the variation of magnetic condition of the object between pre-determined values of the magnetic field other than said maxima.

6. An apparatus for testing magnetizable objects, comprising means for producing a magnetic field about an object, means for varying the field between a maximum of one polarity and a maximum of opposite polarity through intermediate values, and means for indicating a magnetic effect in the object resulting from variation of the field from one of said intermediate values to another.

7. An apparatus for testing magnetizable objects comprising a magnetizing coil, an electric circuit adapted to connect the coil with a source of electric current, an electrical resistance, a commutator for periodically reversing the current in said coil and introducing and cutting out the resistance from the circuit to produce a cyclic variation in the magnetic field of said coil, a test coil in said field adapted to receive an object to be tested, an electrical indicator, a switch for electrically connecting the test coil with the indicator during a portion of a cycle of variation of the magnetic field, and means for operating said switch and said commutator in timed relation.

8. Apparatus for testing magnetizable objects comprising means for producing a field, means for varying the strength of the field, means for varying the direction of the field, means for indicating a magnetic field resulting from a variation of strength or direction in the field, and automatic means for rendering all of said means operative in properly timed relationship.

CHARLES W. BURROWS.